US007203848B2

(12) United States Patent
Mitsubori et al.

(10) Patent No.: US 7,203,848 B2
(45) Date of Patent: Apr. 10, 2007

(54) ELECTRICAL APPARATUS, PROGRAM FOR CONTROLLING ELECTRICAL APPARATUS, AND METHOD FOR CONTROLLING ELECTRICAL APPARATUS

(75) Inventors: Toshiyuki Mitsubori, Kawasaki (JP); Masafumi Aikawa, Yotsukaido (JP)

(73) Assignee: Minolta Co., Ltd., Osaka-Shi, Osaka (JP)

(*) Notice: Subject to any disclaimer, the term of this patent is extended or adjusted under 35 U.S.C. 154(b) by 526 days.

(21) Appl. No.: 10/448,346

(22) Filed: May 30, 2003

(65) Prior Publication Data

US 2004/0158755 A1 Aug. 12, 2004

(30) Foreign Application Priority Data

Feb. 7, 2003 (JP) ............................. 2003-030969

(51) Int. Cl.
*G06F 1/00* (2006.01)
*G06F 1/32* (2006.01)

(52) U.S. Cl. ....................................... 713/300; 713/320

(58) Field of Classification Search ..................... None
See application file for complete search history.

(56) References Cited

U.S. PATENT DOCUMENTS 5,258,751 A * 11/1993 DeLuca et al. ............ 340/7.52
6,321,029 B1 * 11/2001 Kuo ........................... 388/800
6,516,421 B1 * 2/2003 Peters ........................ 713/502
2001/0011995 A1 * 8/2001 Hinckley et al. ........... 345/156
2002/0010806 A1 1/2002 Yamada

FOREIGN PATENT DOCUMENTS

JP 06-262832 9/1994
JP 2000-141820 5/2000
JP 2001-347728 12/2001

OTHER PUBLICATIONS

Notification of Reason for Refusal issued in a corresponding Japanese patent application No. 2003-030969.
Notification of Reason for Refusal dated Aug. 11, 2006, issued in a corresponding Japanese application; and translation.

* cited by examiner

*Primary Examiner*—James K. Trujillo
*Assistant Examiner*—Stefan Stoynov
(74) *Attorney, Agent, or Firm*—Buchanan Ingersoll & Rooney PC

(57) ABSTRACT

A printer changes a setup menu in such a way as to enable a user to select an automatic mode for automatically setting a switching time for switching to a power saving mode in accordance with information concerning execution frequency of a printing process, when a prescribed discrepancy occurs between a prescribed switching time and actual printing process execution status.

20 Claims, 7 Drawing Sheets

FIG. 10

| AVERAGE PRINTING JOB RECEPTION TIME | POWER SAVING MODE SWITCHING TIME |
|---|---|
| 1-14 MINUTES | 15 MINUTES |
| 15-29 MINUTES | 30 MINUTES |
| OVER 30 MINUTES | 60 MINUTES |

ELECTRICAL APPARATUS, PROGRAM FOR CONTROLLING ELECTRICAL APPARATUS, AND METHOD FOR CONTROLLING ELECTRICAL APPARATUS

This application is based on Japanese Patent Application No. 2003-30969, filed on Feb. 7, 2003, the contents of which are hereby incorporated by reference.

BACKGROUND OF THE INVENTION

1. Field of the Invention

The present invention relates to an electrical apparatus whose switching time to switch over to its power saving mode can be set up, in particular, an image forming device whose power saving mode switching time can be set up.

2. Description of the Related Art

In printers marketed these days, it is common to see a control system that switches from a normal mode in which a printing process is executable to a power saving mode which consumes less power than the normal mode, when a time period in which the printing process has not been executed exceeds a prescribed switching time, which is set up separately.

A certain fixed value is normally setup as a default value as the time to switch over to the power saving mode in order to satisfy various electrical standards concerning power saving, such as Energy Star. For example, in case of a color printer that copes with paper of size such as A3 and A4 and has a printing speed of 10<PPM ≦20, where PPM is a unit of printing speed (number of sheets printed per minute), a certain fixed value less than or equal to 60 minutes is set up as a default. In such a case, the time to switch over to the power saving mode can be adjusted by a user to match the usage environment for the printer within a prescribed range.

However, it is difficult for a user to set up a proper power saving mode switching time in case of a network printer connected to a network, as its usage frequency varies dynamically due to differences in usage time bands or changes in the number of users.

In order to solve this problem, various proposals were made for automatically setting up the power saving mode switching time in accordance with the printing frequency in a certain period time in the past or the amount of communication per unit time on the network (e.g., Unexamined Publication No. JP-A-2000-141820).

However, as mentioned above, it is necessary to set up a certain fixed value as a default value of the power saving mode switching time in order to satisfy various electrical standards such as Energy Star for an electrical apparatus such as a printer.

Therefore, it presented a problem that the technologies such as the one disclosed by the above patent application publication, which automatically set up the power saving mode switching time, cannot be applied for an electrical apparatus such as a printer as the methods of satisfying various electrical standards such as Energy Star.

SUMMARY OF THE INVENTION

It is an object of the present invention to provide an electrical apparatus, a program for controlling an electrical apparatus, a method for controlling an electrical apparatus, which are improved for solving the above problem.

A more specific object of the present invention is to provide an electrical apparatus, a program for controlling an electrical apparatus, and a method for controlling an electrical apparatus that allow users to set up proper switching times easily depending on the users' usage environments for the electrical apparatus even if a certain fixed value is prescribed as a default value for the power saving mode switching time.

According to an aspect of the invention, there is provided an electrical apparatus comprising: a controller that switches from a normal mode in which a prescribed process is executable to a power saving mode which consumes less power than the normal mode when a time period in which the prescribed process has not been executed exceeds a prescribed switching time; and a user interface for receiving a user's selection of the switching time, wherein said controller controls said user interface in such a way as to enable the user to select an automatic mode for automatically setting the switching time in accordance with information related to execution frequency of the prescribed process when a prescribed discrepancy occurs between the prescribed switching time and actual execution status of the prescribed process.

According to this invention, even in a case where a certain fixed value is set up as a default value for the power saving mode switching time, the user can easily set up a proper switching time depending on the user's usage environment for the electrical apparatus such as a case of using it as a network printer whose usage frequency changes dynamically due to differences in usage time bands and changes in the number of users.

According to another aspect of the invention, there is provided a program for controlling an electrical apparatus, said program causing a computer to execute a process comprising the steps of: 1) switching an operating mode of said electrical apparatus from a normal mode in which a prescribed process is executable to a power saving mode which consumes less power than the normal mode when a time period in which the prescribed process has not been executed at said electrical apparatus exceeds a prescribed switching time; and 2) controlling a user interface of said electrical apparatus in such a way as to enable a user to select an automatic mode for automatically setting the switching time in accordance with information related to execution frequency of the prescribed process when a prescribed discrepancy occurs between the prescribed switching time and actual execution status of the prescribed process.

According to still another aspect of the invention, there is provided a method for controlling an electrical apparatus comprising the steps of: 1) switching an operating mode of said electrical apparatus from a normal mode in which a prescribed process is executable to a power saving mode which consumes less power than the normal mode when a time period in which the prescribed process has not been executed at said electrical apparatus exceeds a prescribed switching time; and 2) controlling a user interface of said electrical apparatus in such a way as to enable a user to select an automatic mode for automatically setting the switching time in accordance with information related to execution frequency of the prescribed process when a prescribed discrepancy occurs between the prescribed switching time and actual execution status of the prescribed process.

According to a further aspect of the invention, there is provided an electrical apparatus comprising: a controller that switches from a normal mode in which a prescribed process is executable to a power saving mode which consumes less power than the normal mode when a time period in which the prescribed process has not been executed exceeds a prescribed switching time, wherein said controller provides control that sets up an automatic mode for automatically setting the switching time in accordance with information related to execution frequency of the prescribed process when a prescribed discrepancy occurs between the prescribed switching time and actual execution status of the prescribed process.

The objects, characteristics and properties of this invention other than those set forth above will become apparent from the description given herein below with reference to preferred embodiments illustrated in the accompanying drawings.

BRIEF DESCRIPTION OF THE DRAWINGS

FIG. 10 is a diagram showing an example table where the switching time is to be set up in accordance with the average time of receiving print jobs.

DETAILED DESCRIPTION OF THE PREFERRED EMBODIMENTS

The embodiments of this invention will be described below with reference to the accompanying drawings.

Figure 1:
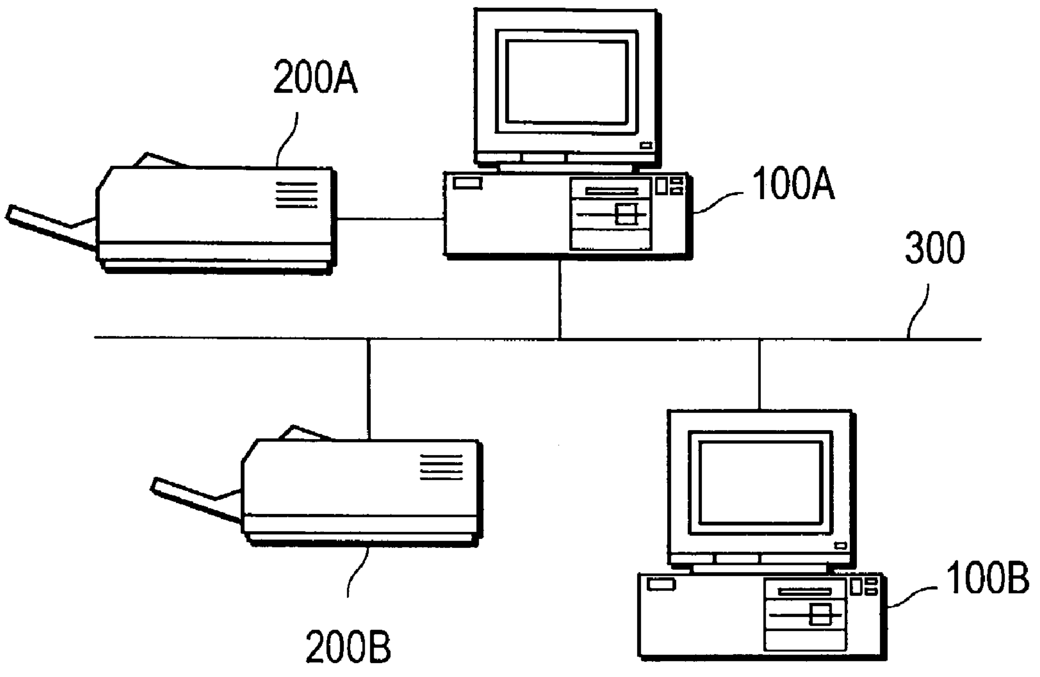
FIG. 1 is a block diagram showing the constitution of a printing system wherein a printer according to an embodiment of the present invention is applied.

FIG. 1 is a block diagram showing the constitution of a printing system wherein a printer according to an embodiment of the present invention is applied.

As shown in FIG. 1, the printing system has personal computers 100A and 100B as well as printers 200A and 200B. The personal computers 100A and 100B as well as the printer 200B are interconnected via a network 300 so that they can communicate with each other. The printer 200A is connected with the personal computer 100A directly (local connection).

The types and the number of equipment to be connected to the network are not limited to those shown in FIG. 1. The network 300 consists of a LAN based on standards such as Ethernet®, Token Ring, FDDI, etc., and a WAN consisting of LANs connected by a dedicated line.

Figure 2:
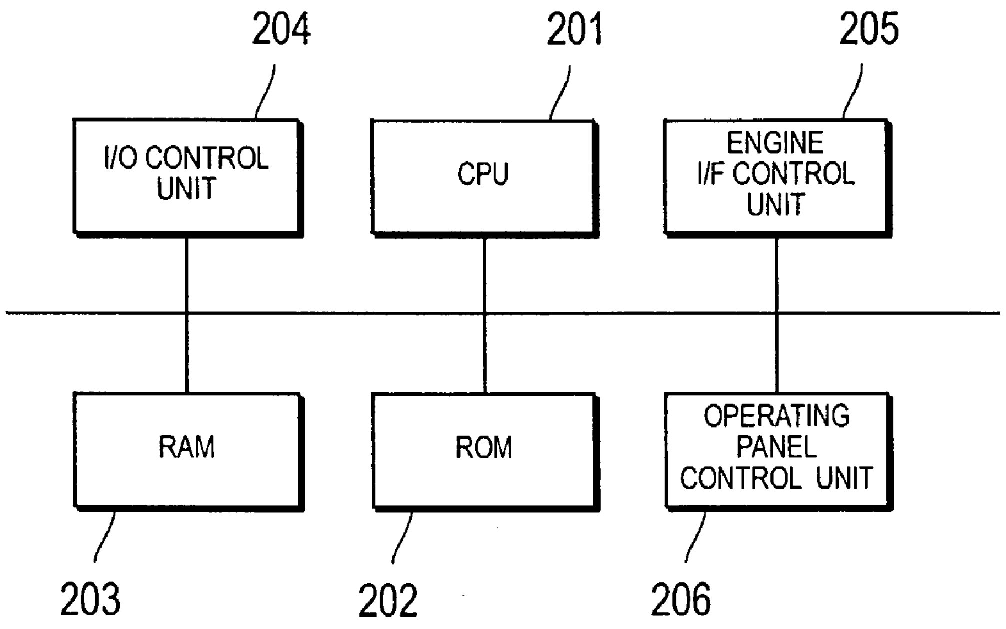
FIG. 2 is a block diagram showing the constitution of a printer controller built into the printer.

FIG. 2 is a block diagram showing the constitution of a printer controller built into the printers 200A and 200B.

As shown in FIG. 2, the printer controller includes a CPU 201 for controlling the entire printer controller and conducting various arithmetic processes, a ROM 202 for storing programs and data, a RAM 203 which functions as a work area for temporarily storing programs and data, an I/O control unit 204 for controlling data input/output in relation to an external device, an engine I/F control unit 205 for interfacing with a printer engine that prints various data on recording media such as paper, and an operating panel control unit 206 for controlling an operating panel used for displaying various information and entering various instructions.

In this embodiment, a case of applying the setup control for the power saving mode switching time to an image forming device such as the printers 200A and 200B will be described. The power saving mode herein means a mode in relation to the apparatus operating condition wherein the power consumption is lower than that in the normal mode (idle mode), which allows immediate execution of a prescribed process, such as printing process.

Next, the job process in the printer will be described below referring to FIG. 3 through FIG. 10. The algorithm shown in the flowcharts of FIG. 3 through FIG. 6 is stored as a program in a memory unit such as the ROM 202 of the printer and executed by the CPU 201.

Figure 3:
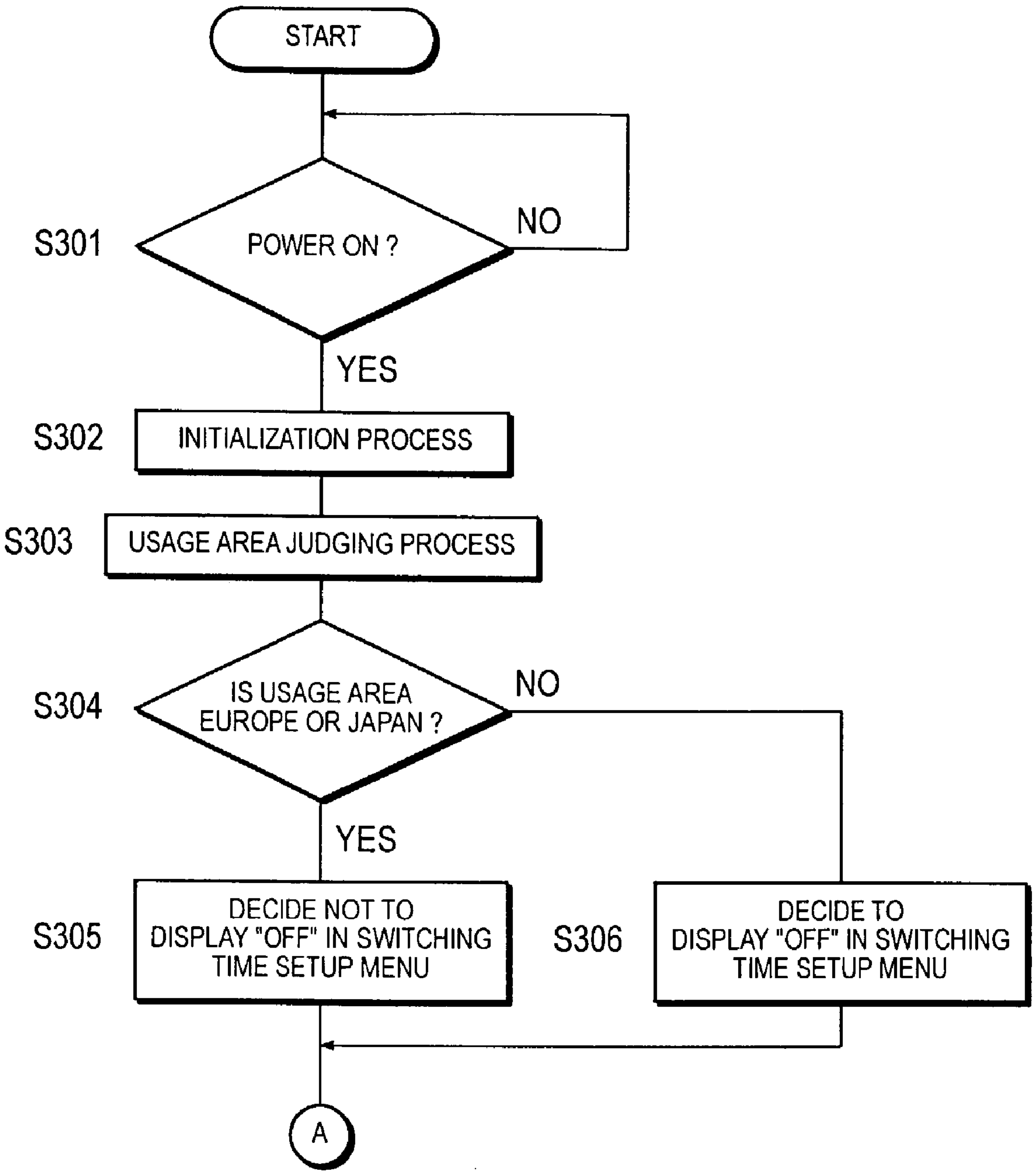
FIG. 3 is a flowchart for describing the action that makes it possible to accept the user's selection of an OFF mode.

First, referring to FIG. 3, let us describe the action that makes it possible to accept the user's selection of a mode for setting no switching time (OFF mode), when the printer is used in an area where switching to the power saving mode is not required.

As the power is applied to the printer (S301: Yes), the printer will be initialized (S302). More specifically, the CPU 201 calls up a prescribed program from the ROM 202, performs checking of writing and reading for the RAM 203 according to said program, and initializes the I/O control unit 204, the engine I/F control unit 205, and the operating panel control unit 206.

Next, the CPU 201 obtains the area determination information from the ROM 202 or from the outside (e.g., the personal computer 100A or 100B) via the I/O control unit 204, and determines the usage area of the printer (S303).

If the usage area determined in step S303 is Europe or Japan (S304: Yes), the CPU 201 decides not to display the radio button for accepting the user's selection of the mode for setting no switching time (OFF mode) (S305). More specifically, the CPU 201 decides not to display the radio button for "OFF" in the setup menu for the power saving mode switching time as shown in FIG. 7.

On the other hand, if the usage area determined in step S303 is neither Europe nor Japan (S304: No), the CPU 201 decides to display the radio button for accepting the user's selection of the mode for setting no switching time (OFF mode) (S306). More specifically, the CPU 201 decides to display the radio button for "OFF" in the setup menu for the power saving mode switching time as shown in FIG. 8.

Figure 7:
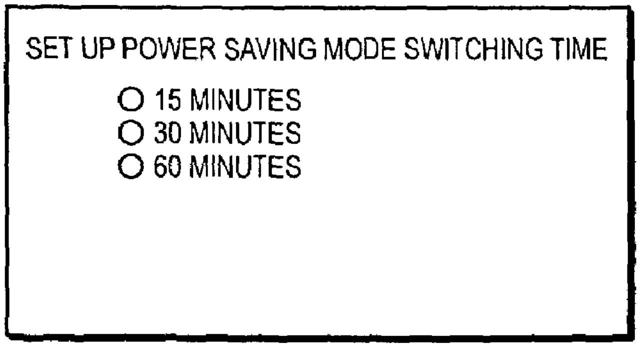
FIG. 7 is a diagram showing an example menu for setting up the power saving mode switching time.
Figure 8:
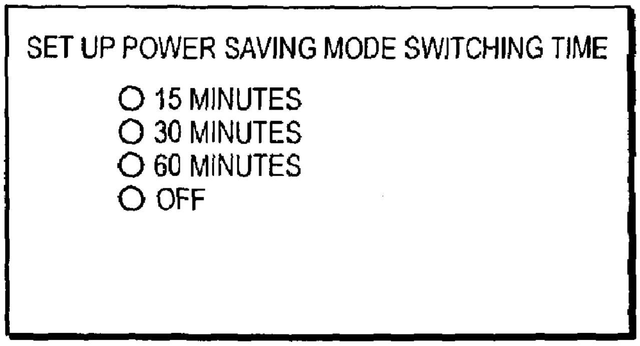
FIG. 8 is a diagram showing an example menu for setting up the power saving mode switching time including "OFF" as a selection item for the switching time.

The setup menus for the power saving mode switching time shown in FIG. 7 and FIG. 8 can be displayed on the operating panel of the printer by means of a specific operation by the user. Thus, the user can select one of the switching time items indicated by radio buttons on the setup menu for the power saving mode switching mode. The switching time items include a specific time such as 15 minutes, 30 minutes and 60 minutes, or "OFF" (OFF mode), which means no switching time is set, as shown in FIG. 7 or FIG. 8. The switching time item set by the user's selection is stored in the internal register of the CPU 201, the internal register of the operating panel control unit 206, or a memory unit, such as the RAM 203.

For example, if the printer is used in USA or Canada, the "OFF" radio button is displayed in the setup menu for the power saving mode switching time. Therefore, the user can select the OFF mode, i.e., setting up no switching time, if the printer is to be used in the area where switching to the power saving mode is not required. Thus, the printer can adapt to a usage environment where the user may not wish the printer to switch to the power saving mode.

Figure 4:
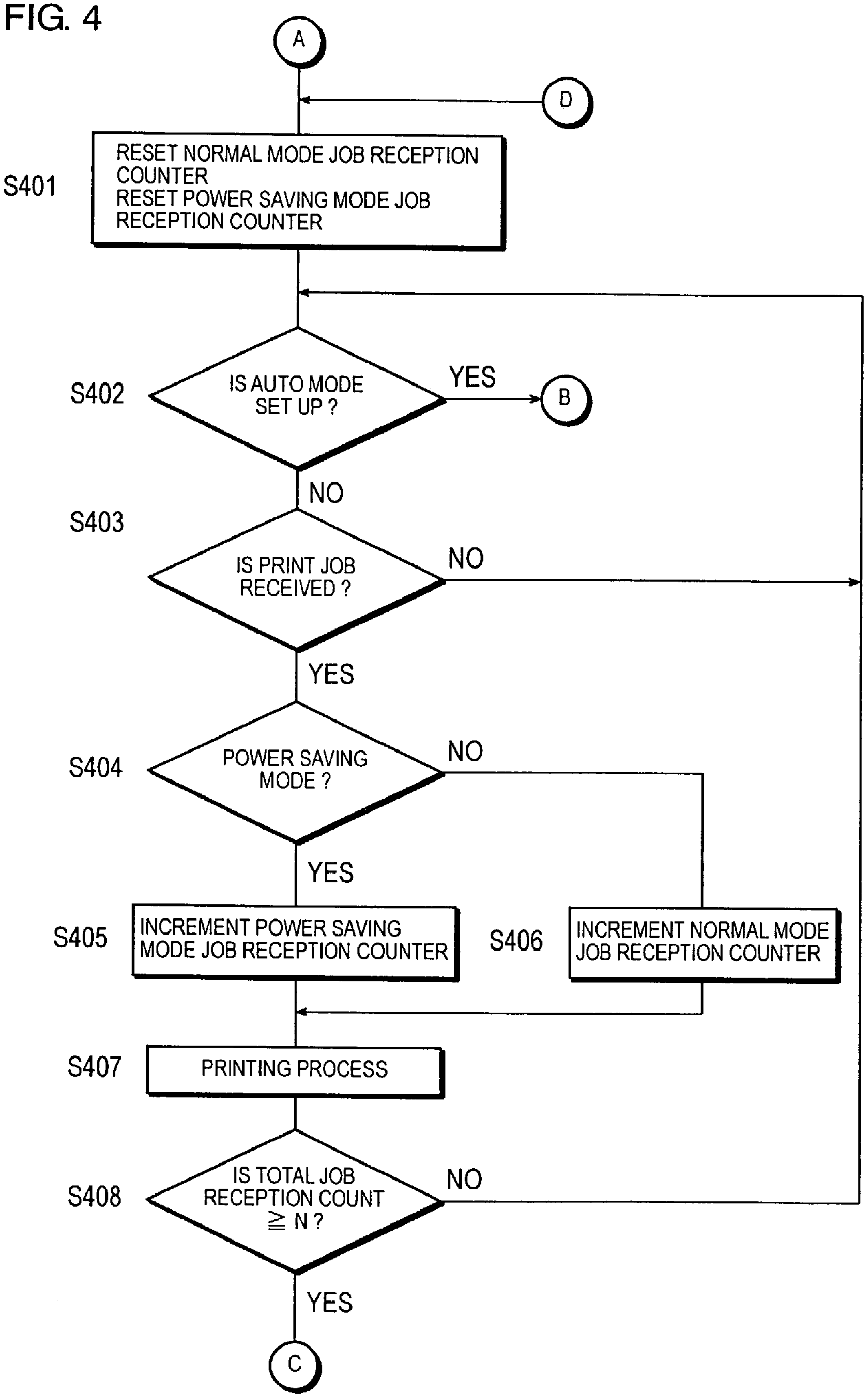
FIG. 4 is a flowchart for describing the action that makes it possible to accept the user's selection of an automatic mode.
Figure 5:
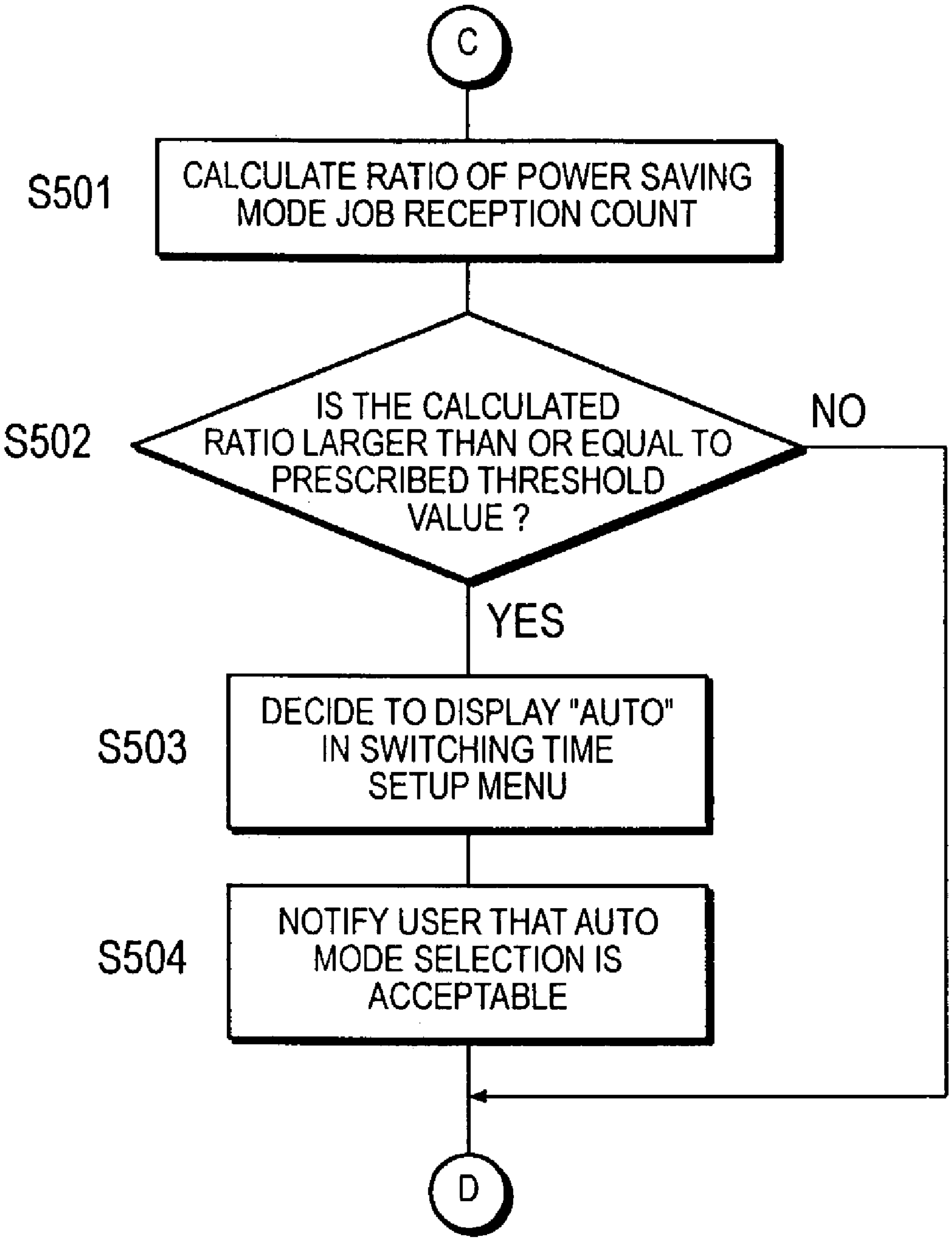
FIG. 5 is a flowchart for describing the action that makes it possible to accept the user's selection of the automatic mode.

Next, referencing to FIG. 4 and FIG. 5, let us describe the action that makes it possible to accept the user's selection of the automatic mode for automatically setting up the switching time in accordance with the information related to the execution frequency of printing processes when a problem occurs to the user caused by the power saving mode switching time, in other words, a prescribed discrepancy occurs between the prescribed switching time and actual execution status of the printing process.

In step S401, a normal mode job reception counter for counting the number of printing jobs received during the normal mode (during the idle mode) and a power saving mode job reception counter for counting the number of printing jobs received during the power saving mode are reset. These counters are constituted in the CPU 201 or the RAM 203.

Next, a judgment is made as to whether the automatic mode is set up, which allows the user's selection based on the process of step S503, to be described later (S402).

If the automatic mode is set up (S402: Yes), the program advances to step S601 shown in FIG. 6 to switch to the action when the automatic mode is set up. The details of the action shown in FIG. 6 will be described later.

If the automatic mode is not set up (S402: No), a judgment is made as to whether a print job including a request for executing the printing process is received (S403). If no print job is received (S403: No), the program returns to step S402.

If a print job is received (S403: Yes), a judgment is made as to whether the print job is received during the power saving mode (S404). If a print job is received during the power saving mode (step 404: Yes), the power saving mode job reception counter is incremented by one (S405). If a print job is received during the normal mode, i.e., not during the power saving mode (step 404: No), the normal mode job reception counter is incremented by one (S406).

Next, printing process is executed based on the print job received (S407). After the printing process is completed, the total number of jobs (printing jobs) received is calculated, and a judgment is made as to whether the total number of jobs received is larger than or equal to a prescribed value N by the CPU 201 (S408).

If the total number of jobs received is smaller than N (S408: No), the program returns to step S402. If the total number of jobs received is larger than or equal to N (S408: Yes), the CPU 201 calculates the ratio of the number of jobs received during the power saving mode against the total number of jobs received (S501 of FIG. 5).

In step S502 of FIG. 5, a judgment is made as to whether the ratio of the jobs received during the power saving mode is larger than or equal to a prescribed threshold value. The prescribed threshold value in step S502 is, for example, 50%, but it is not limited to that value.

If the ratio of the number of jobs received during the power saving mode is smaller than the prescribed threshold value (S502: No), it is determined that the prescribed discrepancy has not occurred between the prescribed switching time and the actual execution status of printing process, so that the program returns to step S401 of FIG. 4.

If the ratio of the number of jobs received during the power saving mode is larger than or equal to the prescribed threshold value (S502: Yes), it is determined that the prescribed discrepancy has occurred between the prescribed switching time and the actual execution status of printing process, so that the program advances to step S503. It can also be arranged to determine that the prescribed discrepancy has occurred between the prescribed switching time and the actual execution status of printing process, if the number of jobs received during a prescribed time period during the power saving mode is larger than a prescribed threshold value.

In step S503, a decision is made for displaying the radio button for accepting the user's selection of the automatic mode for automatically setting the time to switch over to the power saving mode. More specifically, the CPU 201 decides to display the radio button for "AUTO" in the setup menu for the power saving mode switching time as shown in FIG. 9.

Figure 9:
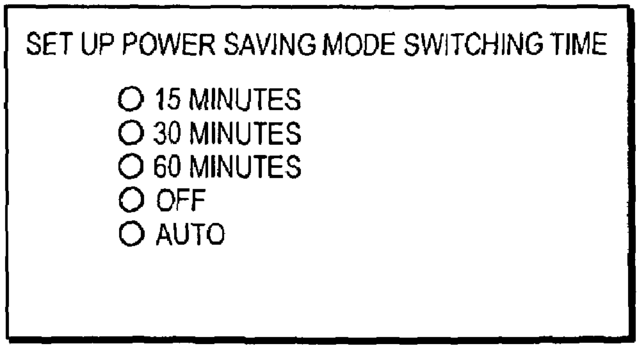
FIG. 9 is a diagram showing an example menu for setting up the power saving mode switching time including "AUTO" as a selection item for the switching time.

The setup menu for the power saving mode switching time shown in FIG. 9 can be displayed on the operating panel of the printer by means of a specific operation by the user. Thus, the user can select one of the switching time items indicated by radio buttons on the setup menu for the power saving mode switching mode. The switching time items include "AUTO" representing the automatic mode for automatically setting the time to switch over to the power saving mode as shown in FIG. 9. In other words, the setup menu functions as a user interface for receiving the user's selection of the switching time.

Next, the CPU 201 notifies the user that the user's selection of the automatic mode is acceptable (S504). More specifically, the notice that the display of the "AUTO" radio button was added to the setup menu for the power saving mode switching time is displayed on the operating panel of the printer. This notice can also be displayed on the user's personal computer via the I/O control unit 204. As a result of such a notice, the user can clearly recognize that the automatic mode is selectable and can take a swift measure.

Figure 6:
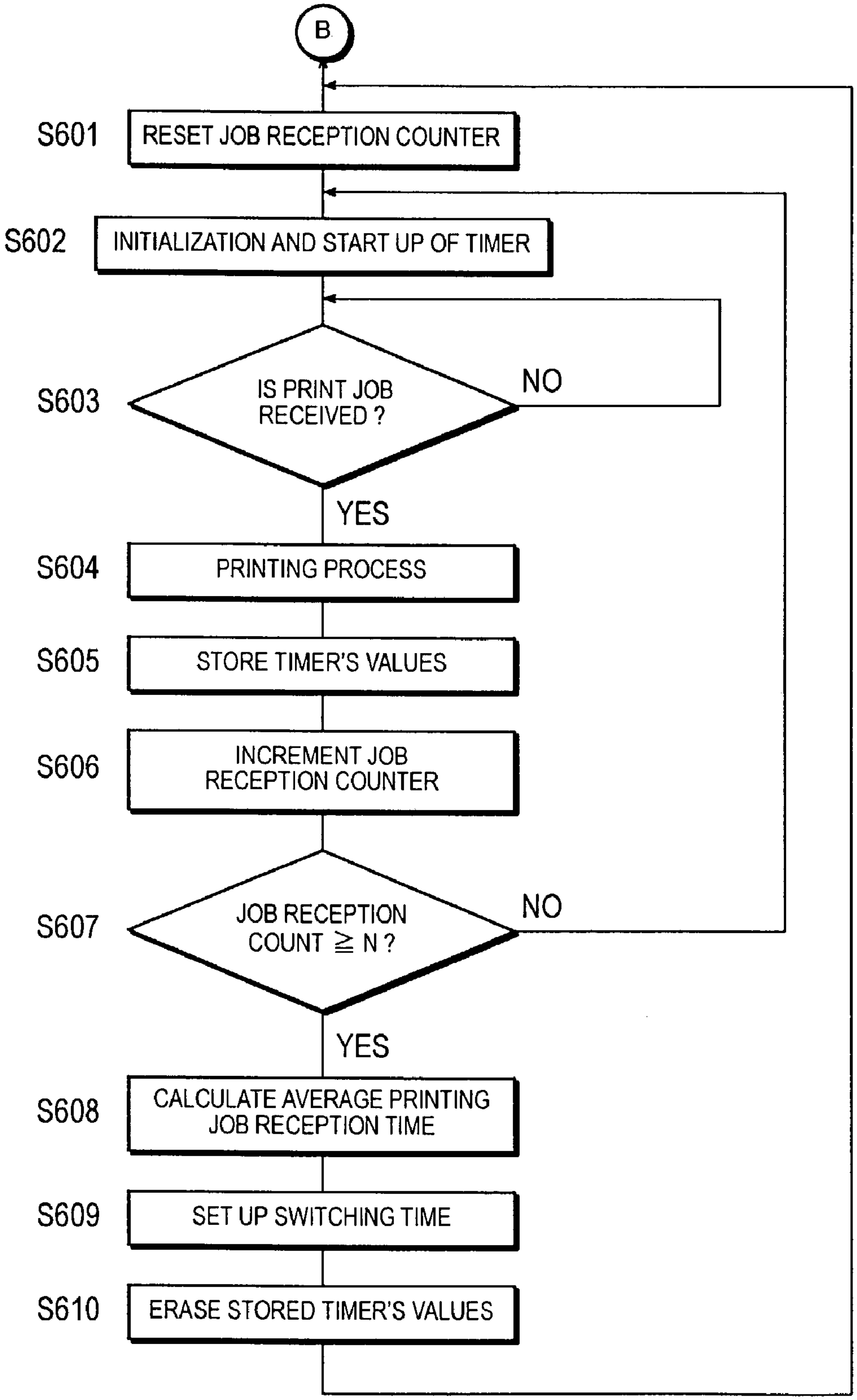
FIG. 6 is a flowchart for describing the action when the automatic mode is set up.

Let us now describe, referring to FIG. 6, the action that follows when it is judged "Yes" in step S402 of FIG. 4 recognizing that the automatic mode is set up.

In step S601, a job reception counter for counting the number of printing jobs received is reset. This counter is different from the normal mode job reception counter or the power saving mode job reception counter, and is constituted in the CPU 201 or the RAM 203.

Next, a timer for counting the elapsed time in hour, minute and second is initialized and started up (S602). This timer is constituted in the CPU 201.

In step S603, the program waits until a printing job including a request for executing a printing process is received.

When a printing job is received (S603: Yes), a printing process is executed based on the printing job received (S604).

After the printing process is completed, the values of the timer, i.e., the hour, minute and second values when the printing process is completed are stored into the RAM 203 (S605).

Next, the job reception counter is incremented by one (S606), and a judgment is made as to whether the number of printing jobs received indicated by the job reception counter is larger than or equal to a prescribed value n (S607).

If the number of printing jobs received is smaller than n (S607: No), the program returns to step S602. On the other hand, if the number of printing jobs received is larger than or equal to n (S607: Yes), an average printing job reception time is calculated (S608). The average printing job reception time is obtained by calculating the average value of the intervals between jobs being received using the historical data (hour, minute and second) of the timer stored in the RAM 203 for each print job. In other words, the average printing job reception time is the mean interval time between printing jobs received.

Next, the switching time is set up in accordance with the calculated average printing job reception time (S609). The setting of the power saving mode switching time is based on the table shown in FIG. 10. FIG. 10 is a diagram showing an example table where the switching time is to be set up in accordance with the average time of receiving print jobs. A specific calculation formula can be used instead of the table.

Also, the number of printing jobs received within a prescribed time period can be used instead of the average printing job reception time. Moreover, it is also possible to use the amount of communication exchanged within a prescribed time period on the network to which the printers are connected as the information related to execution frequency of the printing process.

The printer according to this embodiment provides control for switching from the normal mode to the power saving mode when the time period in which the printing process has not been executed exceeds the separately set switching time. Although the prescribed fixed value is set as a default switching time in this case, the user can change the switching time arbitrary by means of the setup menu for the switching time, including the OFF mode and the automatic mode, displayed on the printer's operating panel by going through the predetermined operating procedure.

When the setting of the power saving mode switching time is completed, the timer values (hour, minute and second historical data) stored in RAM 203 are erased (S610), and the program returns to step S601. The execution of the processes shown in FIG. 3 through FIG. 6 will be terminated when the power is turned off.

As can be seen from the above, the printer according to this embodiment changes the setup menu in such a way as to enable the user to select the automatic mode for automatically setting the switching time for switching to the power saving mode in accordance with the information concerning the execution frequency of the printing process, when the prescribed discrepancy occurs between the prescribed switching time and the actual printing process execution status.

Therefore, even in a case where a certain fixed value is set up as a default value for the power mode switching time, the user can easily set up an appropriate switching time depending on the user s usage environment for the printer such as a case of using it as a network printer whose usage frequency changes dynamically due to differences in usage time bands and changes in the number of users.

It is obvious that this invention is not limited to the particular embodiments shown and described above but may be variously changed and modified without departing from the technical concept of this invention.

For example, the invention can be applied not only to a printer but also to various other image forming devices such as a facsimile device, a copying machine, and an MFP (multi-function peripheral) that has a combination of their functions, as well as to other types of electrical apparatus such as a computer, a display and a scanner.

Moreover, in the embodiment described above, if the ratio of the number of jobs received during the power saving mode is larger than or equal to the prescribed threshold value in step S502 of FIG. 5 (S502: Yes), it is determined that the prescribed discrepancy has occurred between the prescribed switching time and the actual execution status of the printing process, so that it is determined that the user's selection of the automatic mode is acceptable (S503) and the user will be notified that such a selection is acceptable (S504). However, the invention is not limited to the control described above, and it is also possible to provide control to skip the processes of steps S503 and S504 and set up the automatic mode immediately, when the ratio of the number of jobs received during the power saving mode is larger than or equal to the prescribed threshold value (S502: Yes).

The means and method of conducting various processes in the electrical apparatus such as a printer can be realized by means of a dedicated hardware circuit, or a programmed computer. The program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. The program can also be provided as independent application software or can be built into the software of the electrical apparatus as a part of its function.

What is claimed is:

1. An electrical apparatus comprising:

a controller that switches from a normal mode in which a prescribed process is executable to a power saving mode which consumes less power than the normal mode when a time period in which the prescribed process has not been executed exceeds a prescribed switching time; and a user interface for receiving a user's selection of the switching time, wherein when a frequency of requests for executing the prescribed process received during the power saving mode is larger than a prescribed threshhold value, said controller changes said user interface in such a way as to enable the user to select an automatic mode for automatically setting the switching time in accordance with information related to execution frequency of the prescribed process.

2. An electrical apparatus as claimed in claim 1, wherein said prescribed process is a printing process, and said electrical apparatus is an image forming device.

3. An electrical apparatus as claimed in claim 1, further comprising:

a detector that detects a request for executing the prescribed process received during said power saving mode.

4. An electrical apparatus as claimed in claim 3, wherein the frequency of requests detected by said detector is the ratio of a number of the requests detected by said detector to a total number of requests received for executing the prescribed process.

5. An electrical apparatus as claimed in claim 3, wherein the frequency of requests detected by said detector is a number of the requests detected by said detector within a prescribed time period.

6. An electrical apparatus as claimed in claim 1, wherein said controller controls said user interface in such a way as to enable the user to select a mode that does not set up the switching time when said electrical apparatus is used in an area where switching to said power saving mode is not required.

7. An electrical apparatus as claimed in claim 1, wherein said controller notifies the user that said automatic mode has become selectable when the frequency of requests for executing the prescribed process received during the power saving mode is larger than the prescribed threshhold value.

8. An electrical apparatus as claimed in claim 1, wherein the information related to execution frequency of the prescribed process includes an average value of intervals of receiving requests for executing the prescribed process.

9. An electrical apparatus as claimed in claim 1, wherein the information related to execution frequency of the prescribed process includes an amount of communication exchanged within a prescribed time period on a network to which said electrical apparatus is connected.

10. A computer readable storage medium stored with a program for controlling an electrical apparatus, said program causing a computer to execute a process comprising the steps of:

1) switching an operating mode of said electrical apparatus from a normal mode in which a prescribed process is executable to a power saving mode which consumes less power than the normal mode when a time period in which the prescribed process has not been executed at said electrical apparatus exceeds a prescribed switching time; and 2) when a frequency of requests for executing the prescribed process received during the power saving mode is larger than a prescribed threshhold value, changing a user interface of said electrical apparatus in such away as to enable a user to select an automatic mode for automatically setting the switching time in accordance with information related to execution frequency of the prescribed process.

11. A computer readable storage medium stored with a program as claimed in claim 10, wherein said prescribed process is a printing process, and said electrical apparatus is an image forming device.

12. A computer readable storage medium stored with a program as claimed in claim 10, said program further causing the computer to execute the detecting step of detecting a request for executing the prescribed process received at said electrical apparatus during said power saving mode.

13. A computer readable storage medium stored with a program as claimed in claim 12, wherein the frequency of requests detected in the detecting step is the ratio of a number of the requests detected in the detecting step to a total number of requests received for executing the prescribed process.

14. A computer readable storage medium stored with a program as claimed in claim 12, wherein the frequency of requests detected in the detection step is a number of the requests detected in the detection step within a prescribed time period.

15. A computer readable storage medium stored with a program as claimed in claim 10, said program further causing the computer to execute the controlling step of controlling the user interface in such a way as to enable the user to select a mode that does not set up the switching time when said electrical apparatus is used in an area where switching to said power saving mode is not required.

16. A computer readable storage medium stored with a program as claimed in claim 10, wherein said step 2) further includes a step of notifying the user that said automatic mode has become selectable when the frequency of requests for executing the prescribed process received during the power saving mode is larger than a prescribed threshhold value.

17. A computer readable storage medium stored with a program as claimed in claim 10, wherein the information related to execution frequency of the prescribed process includes an average value of intervals of receiving requests for executing the prescribed process.

18. A computer readable storage medium stored with a program as claimed in claim 10, wherein the information related to execution frequency of the prescribed process includes an amount of communication exchanged within a prescribed time period on a network to which said electrical apparatus is connected.

19. A method for controlling an electrical apparatus comprising the steps of:

1) switching an operating mode of said electrical apparatus from a normal mode in which a prescribed process is executable to a power saving mode which consumes less power than the normal mode when a time period in which the prescribed process has not been executed at said electrical apparatus exceeds a prescribed switching time; and 2) when a frequency of requests for executing the prescribed process received during the power saving mode is larger than a prescribed threshhold value, changing a user interface of said electrical apparatus in such a way as to enable a user to select an automatic mode for automatically setting the switching time in accordance with information related to execution frequency of the prescribed process.

20. An electrical apparatus comprising:

a controller that switches from a normal mode in which a prescribed process is executable to a power saving mode which consumes less power than the normal mode when a time period in which the prescribed process has not been executed exceeds a prescribed switching time, wherein when a frequency of requests for executing the prescribed process received during the power saving mode is larger than a prescribed threshhold value, said controller is changed so as to provide control that sets up an automatic mode for automatically setting the switching time in accordance with information related to execution frequency of the prescribed process.

* * * * *